United States Patent [19]

Hirano et al.

[11] Patent Number: 5,844,182
[45] Date of Patent: Dec. 1, 1998

[54] POWER SEAT SWITCH MECHANISM INCLUDING ACTUATORS FOR SELECTIVELY OPERATING SWITCHES

[75] Inventors: Mineo Hirano; Hidetoshi Ohta; Yasuo Torii, all of Tokyo, Japan

[73] Assignee: Niles Parts Co., Ltd., Japan

[21] Appl. No.: 810,136

[22] Filed: Feb. 25, 1997

[30] Foreign Application Priority Data

Mar. 1, 1996 [JP] Japan .................................. 8-071371

[51] Int. Cl.⁶ .......................... H01H 9/00; H01H 15/02; H01H 25/00; B60N 2/44
[52] U.S. Cl. ............................................. 200/5 R; 200/18
[58] Field of Search ................................. 200/5 R, 5 A, 200/17 R, 18, 50.33, 50.34–50.4, 330, 547–551; 297/330

[56] References Cited

U.S. PATENT DOCUMENTS

| | | | |
|---|---|---|---|
| 4,454,390 | 6/1984 | Gmeiner et al. | 200/6 A |
| 4,473,724 | 9/1984 | Suzuki | 200/5 R |
| 4,695,682 | 9/1987 | Winogrocki | 200/5 R |
| 5,021,614 | 6/1991 | Sasaki et al. | 200/5 R |
| 5,128,500 | 7/1992 | Hirschfeld | 200/5 R |
| 5,130,501 | 7/1992 | Maeda | 200/50 C |
| 5,243,156 | 9/1993 | Shirasaka | 200/5 R |
| 5,265,716 | 11/1993 | Sawada et al. | 200/5 R |
| 5,384,440 | 1/1995 | Wnuk et al. | 200/5 R |
| 5,442,149 | 8/1995 | Sato | 200/5 R |

FOREIGN PATENT DOCUMENTS

| | | |
|---|---|---|
| 59-103331 | 7/1984 | Japan . |
| 64-41937 | 3/1989 | Japan . |
| 3-10443 | 1/1991 | Japan . |
| 59-144841 | 9/1997 | Japan . |

*Primary Examiner*—J. R. Scott
*Attorney, Agent, or Firm*—Rader, Fishman & Grauer; Ronald P. Kananen

[57] ABSTRACT

A power seat switch for use in a power seat system of a vehicle for electrically regulating a position and reclining posture of a vehicle seat. The power seat switch comprises a terminal block 1, a printed circuit board 2, module switches 3, an inner case 4, a first moving plate 5, a second moving plate 6, a case 7, a seat knob 8, and a reclining knob 9. The seat knob 8 and the reclining knob 9 are engaged with a plurality of protrusions 52, 62 extending from the first moving plate 5 and the second moving plate 6 and are mounted by superposing the knobs 8, 9 on the case 7. The terminal block 1 includes a connector housing 11 integral therewith. The plurality of module switches each have the same shape and are mounted on the printed circuit board 2 with different orientations. The power seat switch having this structure is small and inexpensive and can be easily mounted in a vehicle.

18 Claims, 4 Drawing Sheets

POWER SEAT SWITCH MECHANISM INCLUDING ACTUATORS FOR SELECTIVELY OPERATING SWITCHES

BACKGROUND OF THE INVENTION

1. Field of the Invention

The present invention relates generally to a power seat switch used in a power seat system for electrically regulating the reclining posture and position of a vehicle seat. More specifically, the present invention relates to a power seat switch having an improved mounting arrangement to make the power seat switch smaller and cheaper.

2. Description of the Related Art

A conventional power seat system has been used to electrically regulate the reclining posture and position of a vehicle seat. The conventional power seat system comprises an actuator section consisting of motors, and so forth, incorporated into a seat portion and a reclining portion of the vehicle seat. The system also comprises a power seat switch section for commanding movements of the actuator section, as well as a controller section including a microcomputer, and so forth.

The conventional power seat system has a power seat switch located generally on a side surface of the vehicle seat, which switch is out of a field of view of a driver. Therefore, the conventional power seat switch includes a knob structure capable of being groped. A conventional power seat switch as described herein is disclosed, for example, in Japanese Utility Model Nos. A-Sho 59-103331, A-Sho 59-144841, A-Sho 64-41937, and A-Hei 3-10443.

However, the conventional power seat switch is relatively difficult to mount, expensive to manufacture, and not very compact.

SUMMARY OF THE INVENTION

It is an object of the present invention to provide an improved power seat switch that overcomes the problems associated with the conventional power seat switches described above.

More specifically, it is an object of the present invention to provide a power seat switch, which is easily mounted and at the same time smaller and cheaper to manufacture.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a power seat switch is provided comprising: a terminal block having a connector housing integral therewith; a printed circuit board on which a plurality of module switches are mounted; a first moving plate and a second moving plate each having a plurality of nails extending therefrom, which are engaged with sliders in the module switches; a case covering the first moving plate and the second moving plate; and a seat knob and a reclining knob mounted on the case, the seat knob and the reclining knob being engaged with a plurality of protrusions extending from the first moving plate and the second moving plate.

The module switches each preferably have the same shape and are mounted on the printed circuit board with different orientations. The terminal block is constructed with metal terminals inserted therein with end portions of the terminals protruding into the connector housing. The printed circuit board includes conductive paths, and the terminals are connected with the module switches through the conductive paths. The number of the sliders of the module switches is preferably equal to the number of the nails extending from the first moving plate and the second moving plate.

An inner case is disposed between the module switches and the first and second moving plates so as to support the first and second moving plates. The inner case has knuckle portions for giving at least one of the seat knob and the reclining knob a knuckle feeling during movement.

The seat knob is preferably elongated in a first direction and engaged at opposite ends with first and second protrusions extending from the first moving plate. The reclining knob is preferably elongated in a second direction transverse to the first direction and engaged at a first end thereof by a third protrusion extending from the second moving plate and at a second end thereof by a fourth protrusion extending from the case adjacent a midpoint of the seat knob.

In accordance with another aspect of the present invention, a power seat switch is provided comprising: a terminal block having a connector housing integral therewith; a printed circuit board on which a plurality of module switches are mounted, each of the module switches having at least one slider; a first moving plate having a first plurality of nails extending therefrom which are engaged with sliders of at least two of the module switches; a second moving plate having a second plurality of nails extending therefrom which are engaged with sliders of at least one of the module switches; a case covering the first moving plate and the second moving plate, the first moving plate having first and second protrusions extending through respective first and second openings in the case, the second moving plate having a third protrusion extending through a respective third opening in the case, a fourth protrusion being formed integral with and extending from the case; a seat knob engaged with the first and second protrusions of the first moving plate for actuating the module switches in engagement with the first moving plate; and a reclining knob engaged with the third protrusion of the second moving plate and the fourth protrusion extending from the case for actuating the module switch in engagement with the second moving plate, the reclining knob being rotatably movable about the fourth protrusion.

The plurality of module switches preferably comprises four module switches each having a pair of sliders extending therefrom, the sliders being linearly movable within the module switches. The sliders of three of the module switches are engaged by the first plurality of nails of the first moving plate, and the sliders of a fourth one of the module switches are engaged by the second plurality of nails of the second moving plate.

The module switches are mounted on the printed circuit board so that half of the sliders are movable transversely to the other half of the sliders. Moreover, the module switches are mounted on the printed circuit board so that the sliders of two of the module switches in engagement with the first plurality of nails are movable transversely to the sliders of the third module switch in engagement with the first plurality of nails.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

Figure 1:
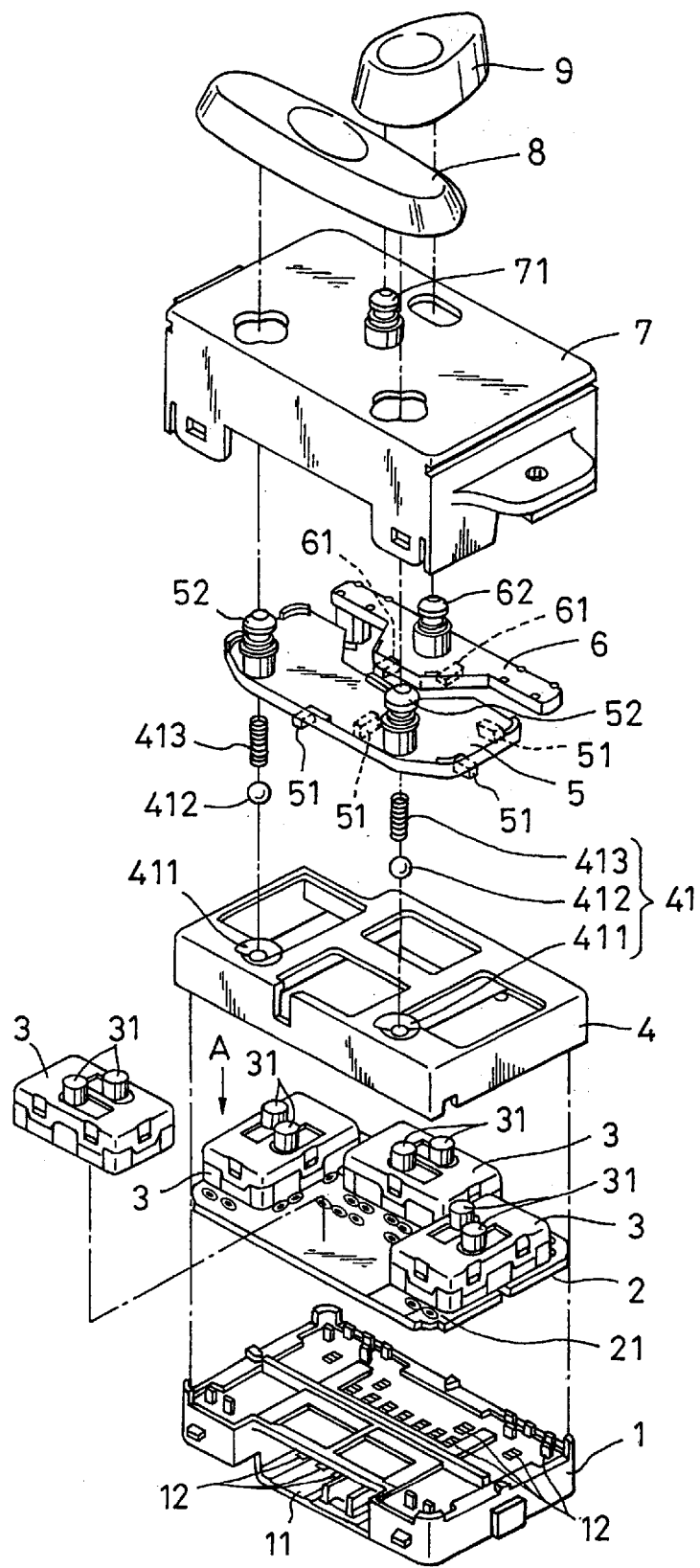
FIG. 1 is an exploded perspective view of a power seat switch according to a preferred embodiment of the present invention.
Figure 2:
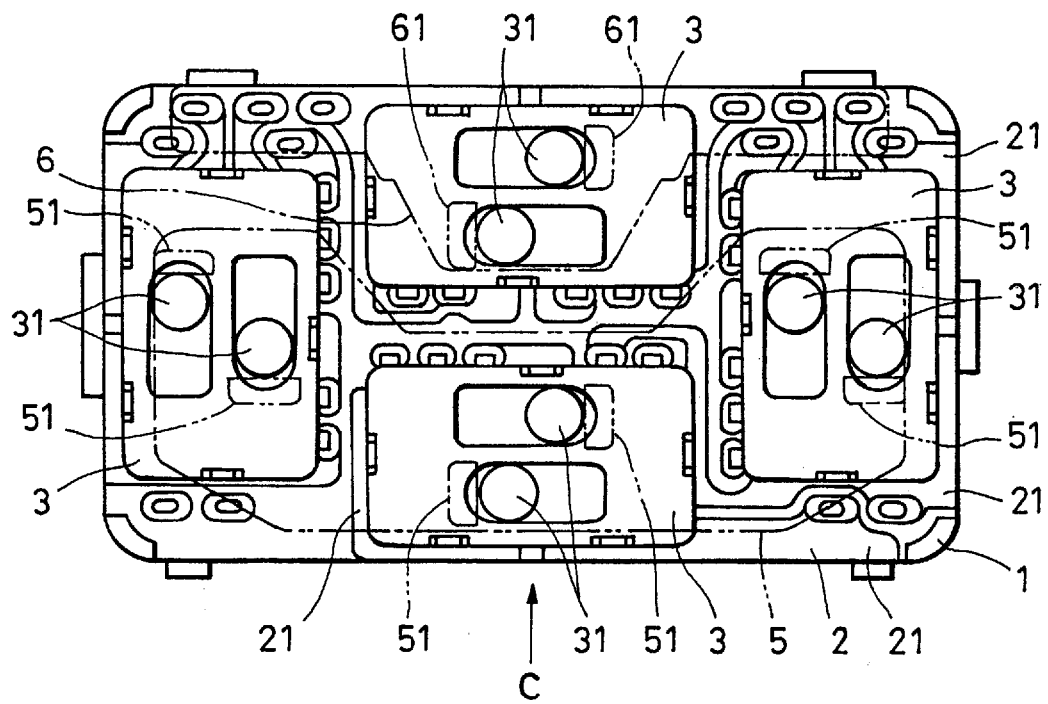
FIG. 2 is a top view of a printed circuit board, on which module switches indicated in FIG. 1 are mounted, as viewed in the direction indicated by arrow A in FIG. 1.
Figure 3:
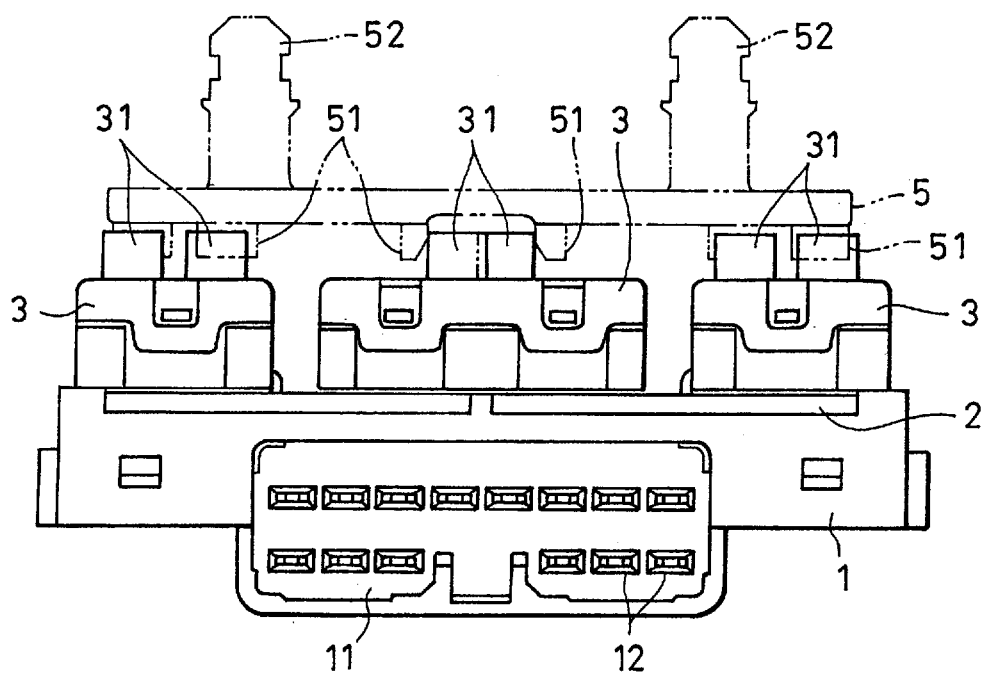
FIG. 3 is a side view of the printed circuit board indicated in FIG. 2, as viewed in the direction indicated by arrow C in FIG. 2.

A preferred embodiment of a power seat switch S according to the present invention will now be described, by way of example, with reference to FIGS. 1 to 6 of the accompanying drawings.

The power seat switch S includes a terminal block 1 having metal terminals 12 formed therein by, for example, insert molding. The terminal block 1 has a connector housing 11 made in one body therewith. End portions of the terminals 12 protrude into the interior of the connector housing 11.

A printed circuit board 2 having conductive paths 21 made of, for example, copper foil is placed over the terminal block 1. Four module switches 3 are mounted on the printed circuit board 2. Each contact of the module switches 3 is connected electrically with each of the terminals 12 through each of the conductive paths 21.

Figure 4:
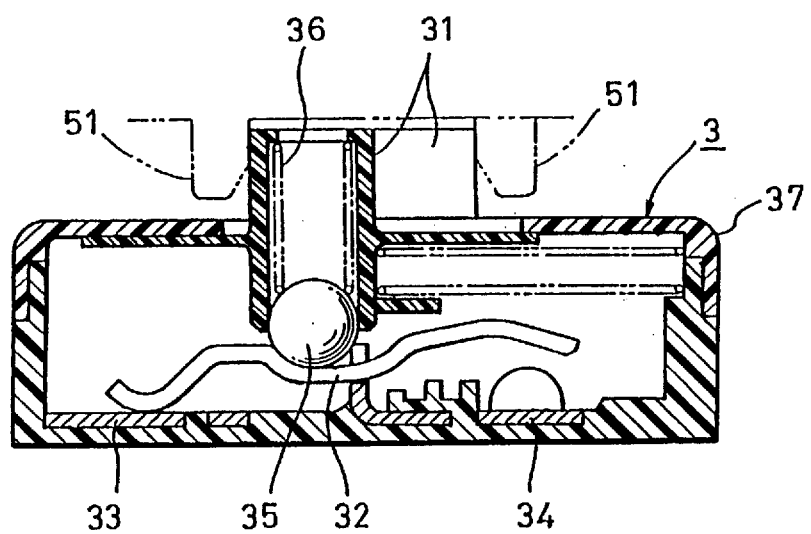
FIG. 4 is an enlarged cross-sectional view of one of the module switches indicated in FIG. 1.

The module switches 3 each have a similar shape. Each of the module switches 3 includes, as shown in FIG. 4, a slider 31 protruding on the upper side thereof, a moving contacting piece 32 which follows the movements of the slider 31, a normally closed contact 33 with which the moving contacting piece 32 is contacted when no external force is applied to the slider 31, a normally open contact 34 with which the moving contacting piece 32 is contacted when an external force is applied to the slider 31, a steel ball 35 for transmitting the external force to the moving contacting piece 32, a first spring 36 for energizing the steel ball 35, and a second spring 37 for energizing the slider 31. The module switches 3 are mounted on the printed circuit board 2 with different orientations.

An inner case 4 is disposed between the module switch 3 and a first moving plate 5, as well as a second moving plate 6, which will be described below. The inner case 4 supports the first moving plate 5 and the second moving plate 6. The inner case 4 has a knuckle portion 41 for giving a seat knob 8 and a reclining knob 9 of the power seat switch S a knuckle feeling. The knuckle portion consists of a recess portion 411, a steel ball 412, and a spring 413.

The first moving plate 5 and the second moving plate 6 each has a plurality of nails 51 and 61, which are engaged with the sliders 31 of the module switches 3, and a plurality of protrusions 52 and 62, with which the seat knob 8 and the reclining knob 9 are engaged. The number of sliders 31 is equal to the number of the nails 51 and 61.

A case 7 is provided for covering the first moving plate 5 and the second moving plate 6. The seat knob 8 is a knob that can be manipulated for regulating a position of a seat portion of a vehicle. The seat knob 8 is engaged with the two protrusions 52 extending from the first moving plate 5. On the other hand, the reclining knob 9 is a knob that can be manipulated for regulating a reclining posture of the vehicle seat. The reclining knob 9 is engaged with the protrusion 62 extending from the second moving plate 6, as well as a protrusion 71 disposed on the upper surface of the case 7.

Since the power seat switch S according to the present invention has a structure, which can be mounted by superposing the reclining knob 9 on the terminal block 1, as explained above, and further the module switches 3 are adopted, the power seat switch can be easily mounted and is smaller and cheaper to manufacture.

The operation of the power seat switch S described above will now be described by reference to FIGS. 5 and 6 of the drawings.

Figure 6:
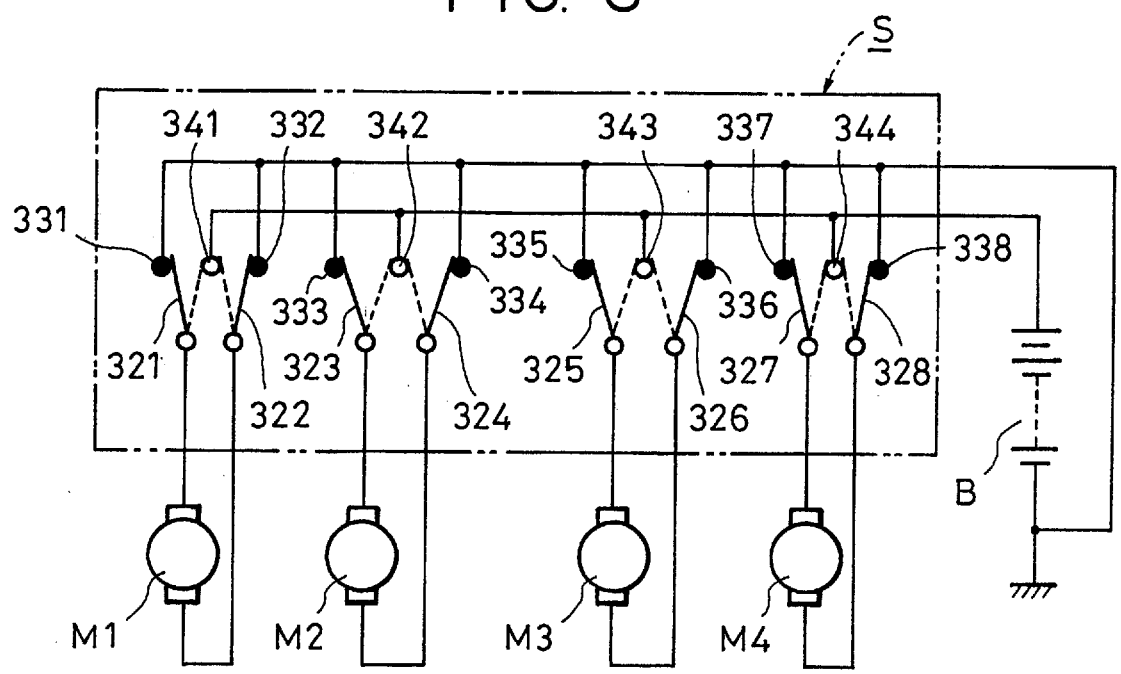
FIG. 6 is an electric circuit diagram according to the preferred embodiment of the present invention.

FIG. 6 is an electric circuit diagram, in which the power seat switch S is connected with motors M1 to M4, which constitute the actuator section of the power seat system, and a DC power supply B of the vehicle. The motor M1 indicated in the circuit diagram moves the seat forward and backward. The motor M2 moves the front portion of the seat upward and downward. The motor M3 moves the rear portion of the seat upward and downward. The motor M4 moves the reclining posture of the seat forward and backward. Connection in the power seat switch S indicated in FIG. 6 is made by using movable contacting pieces 321 to 328, normally closed contacts 331 to 338, and normally open contacts 341 to 344.

Figure 5:
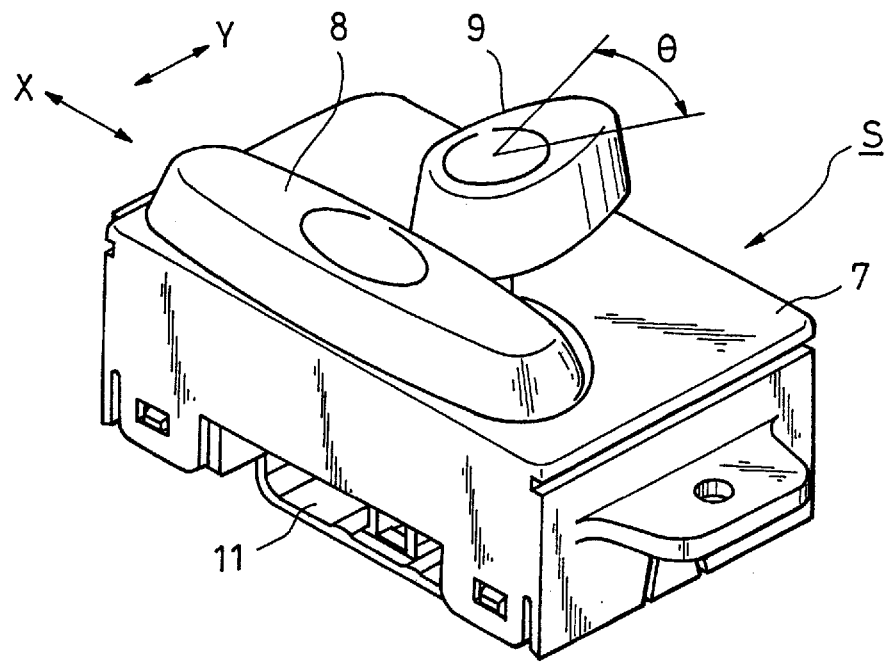
FIG. 5 is a perspective view of a mounted power seat switch indicated in FIG. 1.

When it is desired to regulate the seat in forward and backward directions, the seat knob 8 is moved in the directions indicated by arrows X in FIG. 5. Movement of the seat knob 8 in this direction causes the movable contacting piece 321 or 322 indicated in FIG. 6 to be brought into contact with the normally open contact 341, which drives the motor M1 to move the seat forward or backward.

When it is desired to regulate the front portion of the seat in upward and downward directions, one side of the seat knob 8 is moved in the directions indicated by arrows Y in FIG. 5. Movement of the seat knob 8 in this manner causes the movable contacting piece 323 or 324 indicated in FIG. 6 to be brought into contact with the normally open contact 342, which drives the motor M2 to move the front portion of the seat forward or backward.

When it is desired to regulate the rear portion of the seat in upward and downward directions, the other side of the seat knob 8 is moved in the directions indicated by the arrows Y in FIG. 5. Movement of the seat knob 8 in this manner causes the movable contacting piece 325 or 326 indicated in FIG. 6 to be brought into contact with the normally open contact 343, which drives the motor M3 to move the rear portion of the seat forward or backward.

Further, when it is desired to regulate the reclining position in forward and backward directions, the reclining knob 9 is pivotally moved in the directions indicated by arrows θ in FIG. 5. Movement of the reclining knob 9 in this manner causes the movable contacting piece 327 or 328 indicated in FIG. 6 to be brought into contact with the normally open contact 344, which drives the motor M4 to move the reclining position forward or backward.

As described above, the power seat switch S can regulate the position of the seat and the reclining posture in a vehicle by manipulating the knobs 8, 9.

According to the present invention, a power seat switch is provided which comprises a terminal block having a connector housing made in one body therewith; a printed circuit board on which a plurality of module switches are mounted; a first moving plate and a second moving plate having a plurality of nails engaged with sliders in the module switches; a case covering the first moving plate and the second moving plate; and a seat knob and a reclining knob engaged with a plurality of protrusions extending from the first moving plate and the second moving plate. Because the seat knob and the reclining knob are superposed together on the switch and the plurality of module switches are used, it is possible to provide a small and cheap power seat switch, which can be easily mounted.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A power seat switch comprising:
    a terminal block (1) having a connector housing (11) integral therewith;
    a printed circuit board (2), in electrical communication with said terminal block, on which a plurality of module switches (3) are mounted;
    a first moving plate (5) and a second moving plate (6) each having a plurality of nails (51, 61) extending therefrom, which are engaged with sliders (31) in said module switches;
    a case (7) covering said first moving plate (5) and said second moving plate (6); and
    a seat knob (8) and a reclining knob (9) mounted on said case (7), said seat knob (8) and said reclining knob (9) being engaged with a plurality of protrusions (52, 62) extending from said first moving plate (5) and said second moving plate (6).

2. The power seat switch according to claim 1, wherein said plurality of module switches (3) each have the same shape and are mounted on said printed circuit board (2) with different orientations.

3. The power seat switch according to claim 1, wherein said terminal block (1) is constructed with metal terminals (12) inserted therein with end portions of said terminals (12) protruding into said connector housing (11).

4. The power seat switch according to claim 3, wherein said printed circuit board (2) includes conductive paths and said terminals (12) are connected with said module switches (3) through said conductive paths (21).

5. The power seat switch according to claim 1, wherein the number of said sliders (31) is equal to the number of said nails (51, 61) extending from said first moving plate (5) and said second moving plate (6).

6. The power seat switch according to claim 1, wherein an inner case (4) is disposed between said module switches (3) and said first moving plate (5) and second moving plate (6) so as to support said first moving plate (5) and said second moving plate (6).

7. The power seat switch according to claim 6, wherein said inner case (4) has knuckle portions (41) for giving at least one of said seat knob (8) and said reclining knob (9) a knuckle feeling during movement.

8. The power seat switch according to claim 1, wherein said seat knob (8) is elongated in a first direction and engaged at opposite ends thereof with first and second protrusions (52) extending from said first moving plate (5).

9. The power seat switch according to claim 8, wherein said reclining knob (9) is elongated in a second direction transverse to said first direction, and said reclining knob (9) is engaged at a first end thereof by a third protrusion (62) extending from said second moving plate (6) and at a second end thereof by a fourth protrusion (71) extending from said case (7) adjacent a midpoint of said seat knob (8).

10. A power seat switch comprising:
    a terminal block having a connector housing integral therewith;
    a printed circuit board, in electrical communication with said terminal block, on which a plurality of module switches are mounted, each of said module switches having at least one slider;
    a first moving plate having a first plurality of nails extending therefrom which are engaged with sliders of at least two of said module switches;
    a second moving plate having a second plurality of nails extending therefrom which are engaged with sliders of at least one of said module switches;
    a case covering said first moving plate and said second moving plate, said first moving plate having first and second protrusions extending through respective first and second openings in said case, said second moving plate having a third protrusion extending through a respective third opening in said case, a fourth protrusion being formed integral with and extending from said case;
    a seat knob engaged with said first and second protrusions of said first moving plate for actuating the module switches in engagement with said first moving plate; and
    a reclining knob engaged with said third protrusion of said second moving plate and said fourth protrusion extending from said case for actuating the module switch in engagement with said second moving plate, said reclining knob being rotatably movable about said fourth protrusion.

11. The power seat switch according to claim 10, wherein said plurality of module switches comprises four module switches each having a pair of sliders extending therefrom, said sliders being linearly movable within the module switches.

12. The power seat switch according to claim 11, wherein the sliders of three of said module switches are engaged by said first plurality of nails of said first moving plate, and the sliders of one of said module switches are engaged by said second plurality of nails of said second moving plate.

13. The power seat switch according to claim 11, wherein said module switches are mounted on said printed circuit board such that a first half of said sliders are movable in a transverse direction relative to a direction of movement of a second half of said sliders.

14. The power seat switch according to claim 11, wherein said module switches are mounted on said printed circuit board so that the sliders of two of the module switches in engagement with said first plurality of nails are movable in a transverse direction relative to a direction of movement of the sliders of the third module switch which is in engagement with said first plurality of nails.

15. The power seat switch according to claim 10, wherein the number of said sliders is equal to the number of said nails extending from said first moving plate and said second moving plate.

16. The power seat switch according to claim 10, wherein an inner case is disposed between said module switches and said first moving plate and second moving plate so as to support said first moving plate and said second moving plate.

17. The power seat switch according to claim 16, wherein said inner case has knuckle portions for giving said seat knob a knuckle feeling during movement thereof.

18. The power seat switch according to claim 10, wherein said seat knob is elongated in a first direction and engaged at opposite ends thereof with said first and second protrusions extending from said first moving plate, and said reclining knob is elongated in a second direction transverse to said first direction and engaged at a first end thereof by said third protrusion extending from said second moving plate and at a second end thereof by said fourth protrusion extending from said case adjacent a midpoint of said seat knob.

* * * * *